United States Patent [19]
Tucker et al.

[11] 3,787,099
[45] Jan. 22, 1974

[54] ENDLESS TRACK UNIT

[75] Inventors: Emmitt M. Tucker, Ashland; J. Morris Tucker, Medford, both of Oreg.

[73] Assignee: Tucker & Sons, Sacramento, Calif.

[22] Filed: July 24, 1972

[21] Appl. No.: 274,737

[52] U.S. Cl.............................. 305/25, 305/35 EB
[51] Int. Cl........................................... B62m 27/02
[58] Field of Search ....... 180/5 A, 5 R, 9.5; 305/25, 305/35 EB, 38

[56] References Cited
UNITED STATES PATENTS

| | | | |
|---|---|---|---|
| 3,689,123 | 9/1972 | Barbieri | 180/9.5 |
| 3,077,238 | 2/1963 | Nelson | 180/9.5 X |
| 1,279,619 | 9/1918 | Walker | 180/9.5 |
| 1,808,735 | 6/1931 | Henneuse | 305/25 |
| 3,136,171 | 6/1964 | Nodwell | 305/35 EB |
| 2,561,716 | 7/1951 | Tucker | 180/5 R |
| 2,707,658 | 5/1955 | Grenier | 305/35 EB |

*Primary Examiner*—Richard J. Johnson
*Attorney, Agent, or Firm*—Roger B. Webster

[57] ABSTRACT

An endless track unit for use—in multiple—on an all-terrain vehicle; the unit being substantially triangular in side elevation, and provided with a mount which permits of pivoting of the unit about a transverse axis adjacent the apex of its triangular form; the included endless track being driven by a dual sprocket assembly coaxial with such axis, and such endless track being guided in its lower and working run by a wheel train journaled in connection with said mount.

5 Claims, 5 Drawing Figures

PATENTED JAN 22 1974

ENDLESS TRACK UNIT

BACKGROUND OF THE INVENTION

In the development of all-terrain vehicles wherein, in lieu of wheels, the ground support and traction is provided by power-driven endless track units, problems have heretofore been encountered not only in the mounting and drive mechanisms employed for the endless tracks, but also in the structural design of the latter. As a consequence, maximum traction has not been obtained, track tension necessary for retention has not always been maintained, stability of the vehicle under diverse operating conditions has not been assured, and over-all efficiency has been less than desirable. The present endless track unit, for an all-terrain vehicle, was conceived by us in the light of such problems.

SUMMARY OF THE INVENTION

The present invention provides, as a major object, an improved endless track unit especially designed—but not limited—for use, in multiple, on an all-terrain vehicle; i.e., a vehicle adapted for travel on an essentially off-the-road surface and under widely variant surface conditions, such as presented by snow and mud, and whether on the level or inclined as in hills or mountains.

The present invention provides, as another object, an endless track unit, for the purpose described, which includes a mounting and drive mechanism which permits of oscillation of the unit about an axis a substantial distance aboveground, and hence less susceptible to damage to the pivotal assembly, while at the same time imparting maximum power transfer to the endless track in any oscillatory position thereof.

The present invention provides, as still another object, an endless track unit, as in the preceding paragraph, in which the mounting and drive mechanism, as well as the structural form of the driven endless track, is such that track tension and retention is assured, and the track unit can pivot or oscillate about its pivotal axis without change in the load paths or loss of traction; the track unit being capable of following radical changes in terrain without any marked change in vehicle attitude.

The present invention provides, as an additional object, an endless track unit which, in use in multiple on an all-terrain vehicle, provides excellent flotation, substantially constant traction, and a minimum of side slippage; these characteristics resulting in good handling of the vehicle and producing a smooth ride.

The present invention provides, as a further object, an endless track unit which is designed for ease and economy of manufacture.

The present invention provides, as a still further object, a practical, reliable, and durable endless track unit and one which is exceedingly effective for the purpose for which it is designed.

DESCRIPTION OF THE PREFERRED EMBODIMENT

Figure 1:
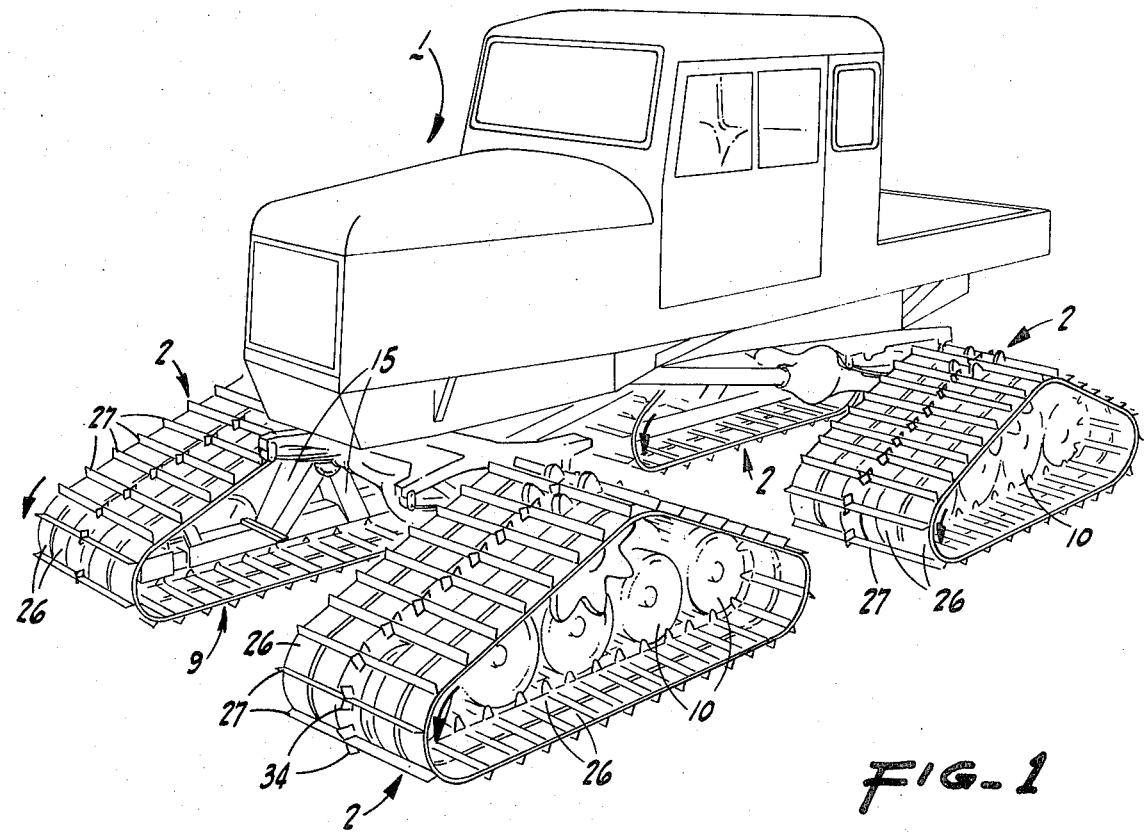
FIG. 1 is a perspective view of an all-terrain vehicle provided with endless track units which embody the present invention; the chassis of the vehicle being shown essentially in outline.

Referring now more particularly to the drawings and to the characters of reference marked thereon, the endless track unit of the present invention is adapted for use—in multiple—on an all-terrain vehicle 1 (see FIG. 1); each such unit being indicated generally at 2, and four of such units being employed on the vehicle—two at the front in transversely spaced relation, and two at the rear similarly spaced. While such units 2 are adapted for steering, this feature forms no part of the present invention.

The vehicle 1 is provided—for each endless track unit 2—with a laterally extending axle housing 3, from the outer end of which a driven axle 4 projects; such axle being fitted with a hub 5 having a flange 6 to which is bolted a radial, internal drive plate 7 of a dual sprocket assembly, indicated generally at 8, and which is hereinafter described in detail.

Figure 2:
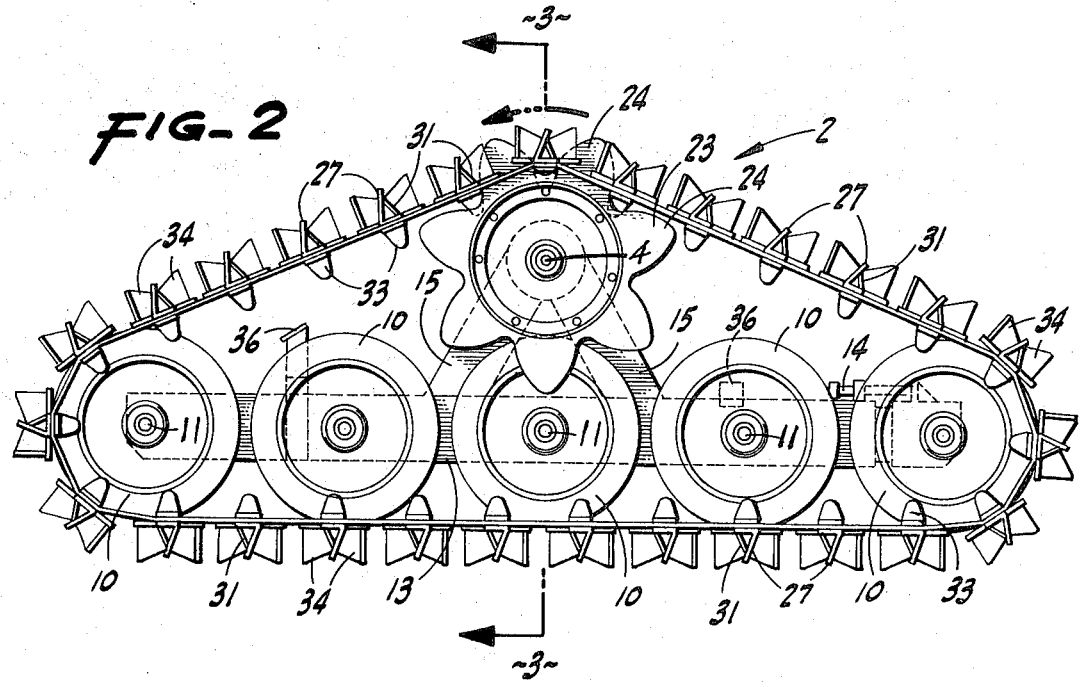
FIG. 2 is an outer-side elevation of one of the endless track units.

The dual sprocket assembly 8 runs in mesh with an endless track, indicated generally at 9, which is of substantially triangular form in side elevation (see FIG. 2); the endless track being engaged, at its apex, in driven relation over said dual sprocket assembly.

The lower and traction run of the endless track 9 is defined and guided by a longitudinal wheel train comprised of a plurality of hard-rubber tire, guide wheels 10—of idler type—disposed in a longitudinal row centrally alined with and directly below the dual sprocket assembly 8. The guide wheels 10 are carried by transverse axles 11 journaled in sleeves 12 on a longitudinal beam 13 disposed in spaced relation below the axle housing 3; the wheels 10 thus being laterally offset in an outward direction from beam 13, and in order to provide the aforesaid central alinement with the dual sprocket assembly 8.

The endless track 9 engages, at the ends of the lower and traction run thereof, in direction-changing relation about the endmost guide wheels 10; the beam 13 being telescopic and adjustable by a screw 14 to properly tension said track as necessary for retention on the dual sprocket assembly, and for proper traction on the surface being traversed.

By means of downwardly diverging legs 15, the beam 13 is suspended, in rigid relation, from and below a journal tube 16 turnably mounted on the axle housing 3 by axially spaced, inboard and outboard journal rings 17 and 18, respectively; such rings and related parts being arranged, as shown, to also prevent axial displacement of said journal tube 16.

With the endless track 9 engaged Over—and driven by—the dual sprocket assembly 8, and guided in its lower run by the train of wheels 10, and with such wheel train suspended by beam 13 and legs 15 from the journal tube 16, the entire endless track unit 2 can oscillate about the axle housing 3 and axle 4 as an axis. This is of great advantage as it permits the track unit to accommodate itself to the terrain being traversed, and without affecting the drive to—or the traction of—the endless track 9, nor the essential stability of the vehicle.

The particular construction of the dual sprocket assembly 8, and the endless track 9, will now be described:

The dual sprocket assembly 8 comprises—in addition to the internal drive plate 7—a drum 19 in which said drive plate is fixed, and which drum is coaxial with the axle 4. At each end, the drum includes an out-turned annular mounting flange 20 to which an annular attachment flange 21 is removably bolted; each attachment flange 21 supporting a flat-faced ring 22.

Figure 4:
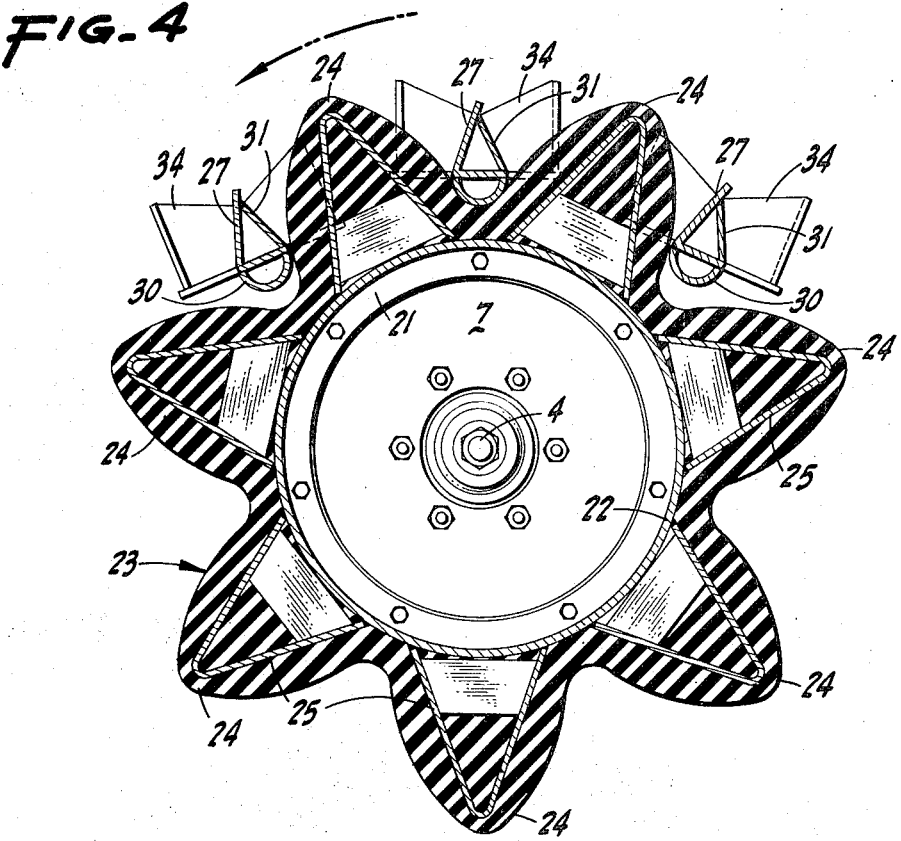
FIG. 4 is a fragmentary longitudinal vertical section taken substantially on line 4—4 of FIG. 3.
Figure 5:
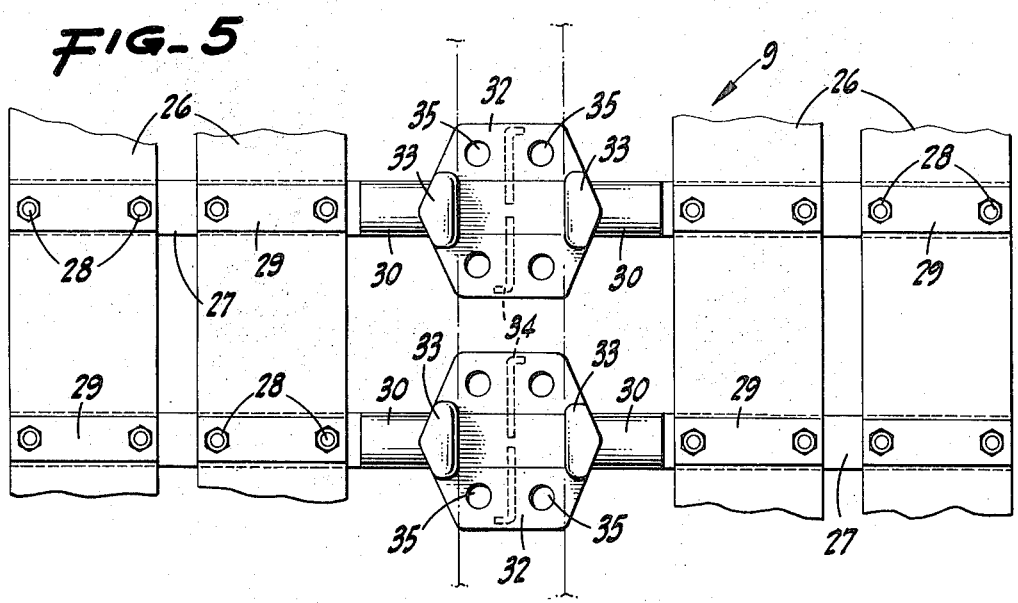
FIG. 5 is a fragmentary plan view taken substantially on line 5—5 of FIG. 3.

Each ring 22 is a unitary part of a sprocket 23 wherein the cogs 24 are of hard rubber, or the like, molded onto the ring 22 and having internal, metallic strengthening members 25 welded to said ring as shown in FIG. 4.

As so constructed, the sprockets are axially alined and spaced apart a predetermined distance for proper meshing engagement with the endless track 9; the latter being constructed as follows:

The endless track 9 comprises a plurality of endless belts 26 disposed in laterally spaced relation; there being, in the present embodiment, four of such belts with the spacing between the belts adjacent the longitudinal center line of the track relatively wide and of slightly greater width than the dual sprocket assembly which works upwardly through such space as will hereinafter appear.

The endless belts 26 are spanned, and secured together, on the outside by a multiplicity of full width, transverse traction bars 27 of slightly acute angle configuration in cross section; such bars being spaced equidistantly circumferentially of the track and are attached to the belts 26 by bolts 28 which extend through washer strips 29 bearing against the backside of said belts.

The spacing of the traction bars 27 is predetermined in relation to the cog array of sprockets 23, and to the end that the same properly mesh, at the apex of the track, with said traction bars; the latter—in the longitudinal vertical plane of each of the sprockets—being fitted on the backside with a half-round drive saddle 30 with which the related sprocket cooperatively engages at said apex. The track 9 is thus positively and effectively driven by the described dual sprocket assembly.

In the central portion thereof, the traction bars are provided, on the trailing side, with brace plates 31 in order to strengthen such bars in the area of greatest load thereon.

Centrally of the ends thereof, and between the corresponding drive saddles 30, each traction bar 27 is formed—on the inside—with a longitudinal, inwardly facing, rigid, plate-like ramp 32 which extends some distance both forwardly and rearwardly of said bar. However, the ends of adjacent ramps, in the circumferential row thereof, are spaced apart somewhat. These wheel ramps 32 provide—in the lower run of the track 9, and at the end-turns thereof—an effective mechanical pathway on which the train of wheels 10 smoothly travels in well-supported relation.

Additionally, the wheel ramps 32 each include, on the inside or working face, a pair of laterally spaced, inwardly projecting wheel guides 33 between which the wheels 10 pass; the effect being to maintain the lower run of the track in proper longitudinal alinement and against undesirable lateral displacement.

On the outside, each wheel ramp 32 includes, in rigid relation, a pair of longitudinally extending, outwardly projecting traction fins 34 disposed centrally of the wheel ramp, and with the fins of such pair on opposite sides of the related transverse traction bar. These fins—being in the central longitudinal vertical plane of the track, and intermediate the sprockets 23—not only enhance traction, but also minimize side slippage.

Holes 35 in the wheel ramps 32 permit of mud and snow escape, and prevent undesirable build-up thereof on the working surfaces of such ramps.

In order to preclude pivotal or oscillatory motion of each endless track unit 2 beyond desired limits, the beam 13 is provided with stop members 36 positioned to engage certain parts (not shown) on the chassis of the vehicle upon the unit 2 reaching such limit of pivotal motion in either a clockwise or counter-clockwise direction.

By virtue of the novel construction of the endless track unit herein described, numerous functional advantages are attained, and which include the following:

As each track unit on the vehicle is capable of independent pivoting about its pivotal axis in response to the terrain being traversed, maximum traction is obtained while at the same time the vehicle remains essentially without material change in attitude.

Figure 3:
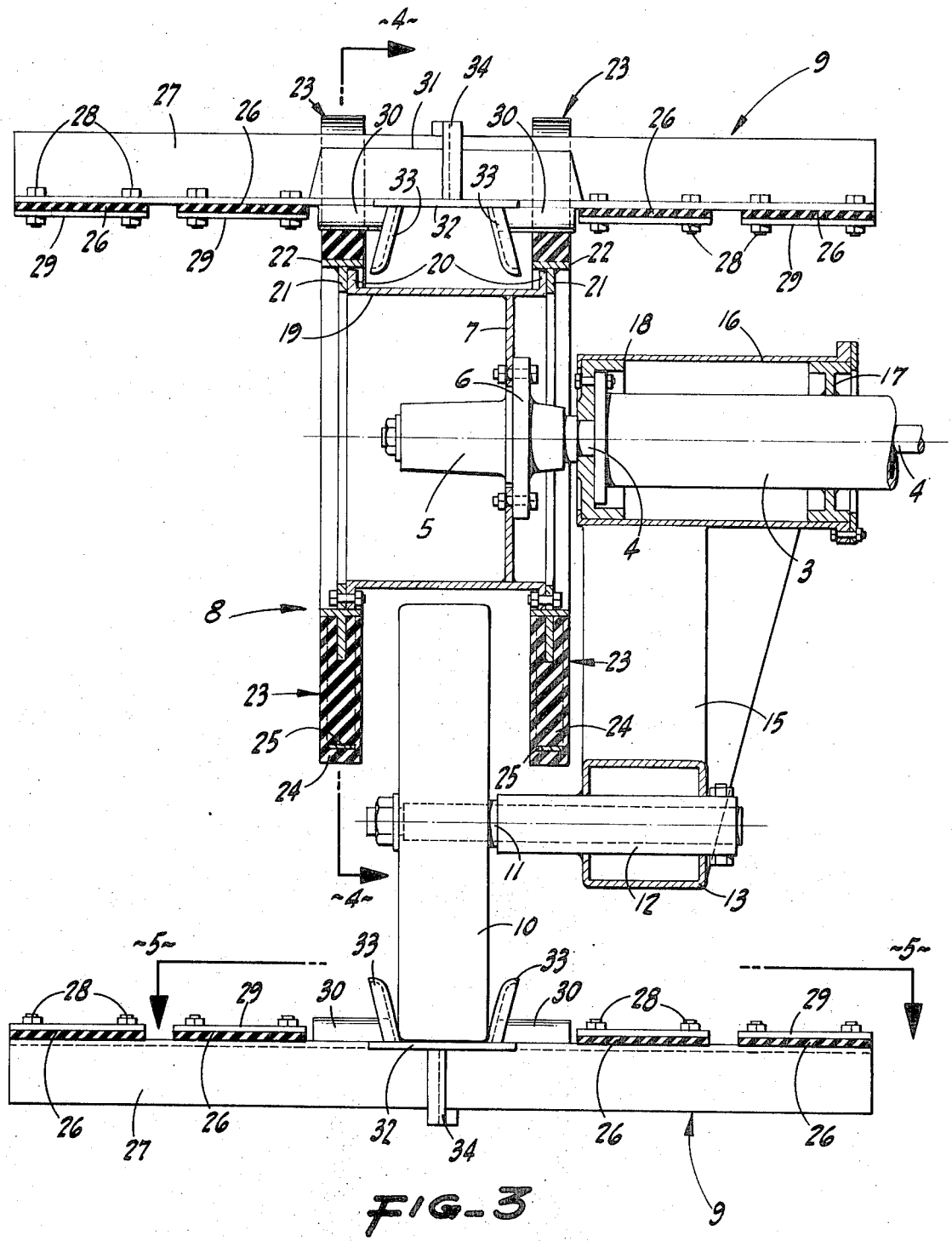
FIG. 3 is a transverse vertical section taken substantially on line 3—3 of FIG. 2.

The dual sprocket assembly 8 better distributes the drive forces to the track 9, and, therefore, greatly reduces the high bending moment at the center of the track attendant a conventional single drive sprocket. Also, the dual sprocket assembly, with the sprockets 23 axially spaced, permits of greater vertical compactness of the unit as the guide wheels 10 can, at the upper portion, be disposed between the sprockets as shown in FIG. 3.

With the form of the sprockets 23 as here disclosed, and as the manner of their engagement with the track is precisely predetermined, there is no tendency for the track 9 to escape the sprockets, and they remain under proper tension at all times.

As the longitudinal center line of the track 9 is unobstructed, such portion—including the wheel ramps 32—provides an effective central pathway for the guide wheels 10, and one which—because said wheel ramps are closely disposed—results in non-bumpy operation of the track, and a resultant vehicle ride which is quite smooth.

The traction fins 34—being directly in the central longitudinal vertical plane of the track unit, and hence directly below the train of wheels 10 when in the lower run of the track—exert, for penetration, a maximum downward pressure on the terrain, and, additionally, effectively resist side slippage.

The following will also be recognized, in the present disclosure, as features of merit:

As shown, the design thereof is such that the engagement of each sprocket 23 with the endless track 9 is limited to a one-or-two cog contact; this eliminating the need for precise pitch control of the endless track which naturally changes pitch under load, and which is a major cause of sprockets "jumping." Another inevitable fact in the use of belts 26—which are rubber—is the characteristic of the material to stretch and gradually increase in length. Here, however, and due to the one-or-two cog engagement with the track, the sprocket fit is only minutely effected by the resultant pitch change.

The provision of hard rubber tires on the guide wheels 10 is beneficial in that—after initial adjustment of the effective length of the wheel train—relatively constant tension is maintained on the endless track 9; the hard rubber tires also providing a relatively non-yielding surface to react side loads induced from turning or side-hilling of the vehicle. Further, the wheel ramps 32 and guides 33 are shaped for effective engagement of the guide wheels 10 while, at the same time, reducing the friction load and tire wear otherwise attendant, and to also prevent guide-wheel damage when the terrain being traversed causes radical entry angles.

As the length of an endless track between the endmost guide wheels is a substantial factor in track retention, the relatively short length of the present track 9, in its working run, assures of track retention under adverse conditions of load and terrain. In actuality, the present endless track has been designed to function over a wide range of terrain, varying from deep soft snow or mud to hard ice or rock, and the angle of the track has been set to maintain the exit conditions such that the terrain is left without undue disturbance.

It is also to be recognized that—by reason of the fact that the sprockets 23 are relatively narrow in the side-to-side dimension, and can flex somewhat laterally—a definite anti-icing effect is attained; i.e., any tendency of ice to build up on the sprockets and to then jam with, or damage, the track is substantially precluded.

From the foregoing description, it will be readily seen that there has been produced such an endless track unit as substantially fulfills the objects of the invention, as set forth herein.

While this specification sets forth in detail the present and preferred construction of the endless track unit, still in practice such deviations from such detail may be resorted to as do not form a departure from the spirit of the invention as defined by the appended claims.

We claim:

1. In an endless track unit, for a vehicle which embodies a transverse axle housing and a driven axle projecting therefrom, a pair of sprockets secured on the axle in axially spaced relation, a longitudinal beam disposed in vertically spaced relation below the axle housing, means mounting the beam in connection with the axle housing for oscillation thereabout as an axis, a wheel train journaled on the beam, the wheels of said train occupying the central longitudinal vertical plane of the track unit, and an endless track of generally triangular configuration in side elevation engaged at its apex in driven relation over the pair of sprockets and guided in the lower and traction run by said wheel train, the track having laterally spaced endless belts disposed so that the sprockets extend upwardly between said belts at the apex of the track unit, and circumferentially spaced transverse traction bars spanning in secured relation between such belts and engaged by said sprockets; the improvement characterized by laterally spaced drive saddles fixed on the traction bars between said belts and positioned for engagement by corresponding sprockets, wheel ramps rigidly secured to and extending forwardly and rearwardly of the traction bars between and in integral relation to the drive saddles, the wheel ramps being disposed in said central longitudinal vertical plane whereby in the lower run of the track the wheels of said train ride such ramps, and a pair of laterally spaced inwardly projecting wheel guides on each wheel ramp, the wheel guides upstanding in said lower run of the track whereby the wheels riding the ramps relatively pass between such guides.

2. An endless track unit, as in claim 1, in which the drive saddles are of semi-circular form in cross section and face inwardly from the related traction bar.

3. An improvement, as in claim 1, in which each wheel ramp includes a longitudinal traction fin which projects outwardly from said ramp.

4. An improvement, as in claim 1, in which each wheel ramp is plate-like and formed with a plurality of holes for passage of foreign substances.

5. An improvement, as in claim 1, in which each wheel ramp is plate-like and dimensioned so that related ends of the ramps are disposed in adjacent but spaced relation in the runs of the track.

* * * * *